(No Model.)

J. O. DAVIS.
CATTLE TIE.

No. 476,523. Patented June 7, 1892.

Witnesses,
O. E. Van Doren,
O. G. Hawley.

Inventor,
John O. Davis,
By Paul & Merwin
Attorneys.

UNITED STATES PATENT OFFICE.

JOHN O. DAVIS, OF GOODHUE, MINNESOTA.

CATTLE-TIE.

SPECIFICATION forming part of Letters Patent No. 476,523, dated June 7, 1892.

Application filed January 23, 1892. Serial No. 418,996. (No model.)

*To all whom it may concern:*

Be it known that I, JOHN O. DAVIS, of Goodhue, in the county of Goodhue and State of Minnesota, have invented certain Improvements in Cattle-Tyers, of which the following is a specification.

My invention relates to cattle-tyers for use in connection with the manger; and its object is to provide a device for readily and safely tying cattle before their mangers.

To this end my invention consists in a tie adjustable to any manger, and of the particular construction hereinafter described, and particularly pointed out in the claims.

My invention will be more readily understood by reference to the accompanying drawings, in which—

Figure 1:
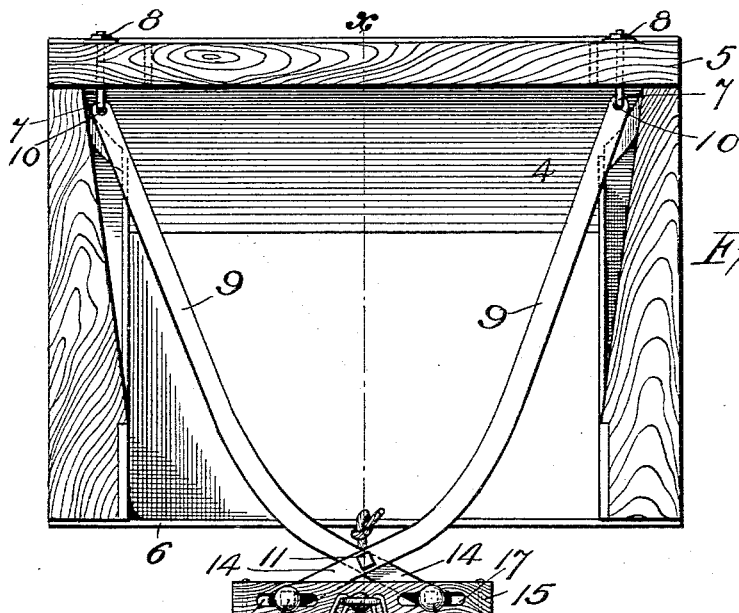
Figure 2:
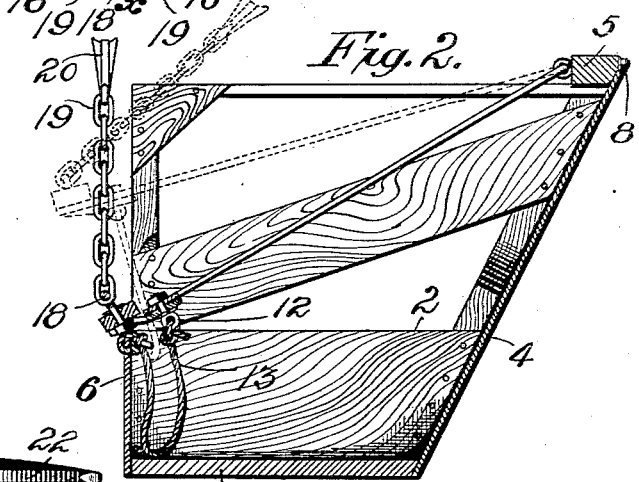
Figure 3:
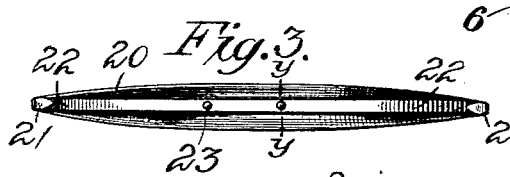
Figure 4:
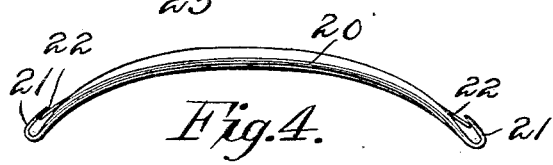
Figure 5:
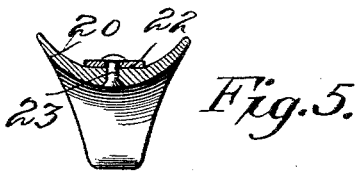

Figure 1 is a plan view showing a manger provided with a cow-tyer embodying my invention. Fig. 2 is a vertical section thereof on the line $x\,x$ of Fig. 1. Fig. 3 is a plan view of the snap-yoke which I employ. Fig. 4 is a side view thereof. Fig. 5 is an enlarged section on the line $y\,y$ of Fig. 3.

As shown in the drawings, 2 represents the manger of the ordinary construction having the bottom 3, the back boards 4, the top rail 5, and the low base-board 6. The eyebolts 7 extend through and are fastened in the rail 5 by nuts 8. These eyebolts serve to secure the upper ends of the tie bars or levers 9, having the openings 10, in which the eyebolts are fastened. The bars 9 incline toward the middle of the stall and are curved in toward each other at their lower ends and fastened together by the bolt or pivot 11, which has on its lower end the eye 12, in which the rope or chain 13 is fastened. The lower end of this rope, as shown, is secured in the base-board 6 and prevents the device from being raised so far as to permit the cow to get her feet into the manger.

To the short arms 14 of the levers 9 I fasten the cross head or block 15 by the bolts 16, having the nut on their lower ends. The head 15 has the slot 17 for admitting these bolts and adapted to permit a movement of the same, and thereby allow the spreading or contracting of the upper ends of the levers 9 to adjust the same to any width of stall or manger, it being advisable to have as large a space as possible between the levers 9. After the ends of the levers have been fastened in the eyebolts 7 the bolts 16 are tightened to lock the bar 15 tightly on the lower ends of the levers. The large eye 18 is swiveled in the middle of the block 15, and short chains 19, made up of large links, extend up from each side, the upper ends thereof being fastened in opposite ends of the yoke-bar 20. This yoke-bar is of the light and strong construction shown in Figs. 3, 4, and 5 of the drawings, being made up of the grooved or curved bar, also curved longitudinally, so as to rest comfortably and snugly on the neck of the animal. The outer ends 21 are curved up to form hooks, and a flat steel spring 22 is fastened in the hollow or groove of the top of the bar by one or two rivets 23. The end of this flat spring is arranged beneath the hooks 21, so that after the chain has been snapped into the same the same may be removed only after first pressing down the ends of the spring. The links of the chain 19 are large enough to permit the snapping in of the bar at any point, so that the chain and yoke may be made to fit snugly on the neck of the cow. The tie being pivoted on the rail 5 the animal is allowed full freedom in standing or in lying down at the same time. Although the neck-yoke chains permit an easy movement of the head from side to side, they are not long enough to allow the animal to hook another at the next manger. I make the lever 9 of flat spring-steel and yield slightly to a pull, thereby avoiding any serious jar to the neck of the animal in jerking back suddenly. The levers 9 extend across the front of the manger and prevent pulling out of the hay, serving rather to press the hay down into the bottom of the manger.

In addition to these advantages there are others common to all devices of a like nature.

Having thus described my invention, I claim as new and desire to secure by Letters Patent—

1. The combination, with a manger, of two levers pivoted thereon and having their lower ends pivoted on one another, a short bar fastened thereon, and a chain-yoke secured on said bar for fastening the head of the animal, substantially as described.

2. The combination, with the rail of a manger, of levers 9, having their upper ends pivoted thereon, the lower ends of said levers being bent in toward one another and pivotally secured together, a bar with respect to which said levers are adjustable, and a flexible yoke secured to said bar, substantially as described.

3. The combination, with a manger, of levers 9, pivoted thereon, the lower ends of said levers being pivotally connected, a bar 15, provided with slots 17, bolts 16, arranged in said slots and in the extreme ends of said levers, an eyebolt arranged in said bar, short chains 19, extending therefrom, and a yoke-bar having ends whereon said chains may be fastened, substantially as described.

4. The combination, with the bolts 7, of the levers 9, having their ends secured thereon, the short arms 14 of said levers, the pivotal bolt 11, bolts 16, the slotted bar 15, secured thereby, means for limiting the upward movement of said levers, and a yoke arranged on the bar 15, substantially as described.

5. The combination, with the bolt 7, of the levers 9, having their ends secured thereby, the short arms 14 of the said levers, pivot-bolts 11, the slotted bar 15, secured thereby, a swivel-bolt 18 in said bar 15, short chains 19, extending therefrom, and a yoke 20, having snap-hook ends to engage said chains, substantially as described.

6. The combination, with the pivoted levers, of the fastenings for the upper ends thereof, the projecting lower ends of the levers, the block arranged thereon, the chains 19, having their lower ends secured on said block, the yoke-bar 20, consisting of the grooved and longitudinally-curved bar having hooked ends 21, and the spring 22, arranged on said bar and adapted to close said hooks, wherein the links of said chains are adapted to be secured, substantially as described.

In testimony whereof I have hereunto set my hand this 14th day of January, A. D. 1892.

JOHN O. DAVIS.

In presence of—
   J. T. ERICKSON,
   C. C. JOHNSON.